United States Patent
Mastie et al.

(10) Patent No.: US 11,662,965 B1
(45) Date of Patent: May 30, 2023

(54) ADDRESS VERIFICATION COORDINATION FOR MAIL PIECES

(71) Applicants: Scott D. Mastie, Longmont, CO (US); Helson Rosa, Boulder, CO (US)

(72) Inventors: Scott D. Mastie, Longmont, CO (US); Helson Rosa, Boulder, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/676,617

(22) Filed: Feb. 21, 2022

(51) Int. Cl.
G06F 3/12 (2006.01)
G07B 17/00 (2006.01)

(52) U.S. Cl.
CPC ............ G06F 3/1234 (2013.01); G06F 3/121 (2013.01); G06F 3/1275 (2013.01); G06F 3/1288 (2013.01); G07B 17/00314 (2013.01); G07B 17/00435 (2013.01); G07B 2017/00322 (2013.01); G07B 2017/00443 (2013.01); G07B 2017/00451 (2013.01)

(58) Field of Classification Search
CPC ...... G06F 3/1234; G06F 3/121; G06F 3/1275; G06F 3/1288; G07B 17/00314; G07B 17/00435; G07B 2017/00322; G07B 2017/00443; G07B 2017/00451
See application file for complete search history.

(56) References Cited

U.S. PATENT DOCUMENTS

| | | | |
|---|---|---|---|
| 6,826,548 B2 | 11/2004 | Hungerpiller et al. | |
| 7,328,085 B2 | 2/2008 | Fogel et al. | |
| 8,046,416 B2 | 10/2011 | Biasi et al. | |
| 10,643,113 B2 | 5/2020 | Cousins et al. | |
| 2009/0157745 A1 | 6/2009 | Quine | |
| 2009/0159509 A1* | 6/2009 | Wojdyla | B07C 3/00 700/226 |
| 2009/0307155 A1* | 12/2009 | Rico | G07B 17/00362 705/404 |
| 2018/0113658 A1* | 4/2018 | Sikkink | G06F 3/1263 |
| 2022/0084437 A1* | 3/2022 | Cannon | G09B 21/005 |

* cited by examiner

Primary Examiner — John R Wallace
(74) Attorney, Agent, or Firm — Duft & Bornsen, PC

(57) ABSTRACT

Systems and methods are provided for address verification support. One embodiment includes a print server. The print server includes an interface that receives a print job comprising multiple mail pieces which each include an address of record from a client, and a controller that processes the print job according to a first workflow of the print server accessible by a first set of operators, detects address anomalies within the mail pieces by accessing an address verification system of a delivery entity, generates a second workflow that is for handling a mail piece having an address anomaly and is accessible only by a second set of operators distinct from the first set of operators, and confirms that the address of record for the mail piece in the second workflow has been updated based on input from the second set of operators.

20 Claims, 8 Drawing Sheets

FIRST WORKFLOW

SECOND WORKFLOW

ADDRESS VERIFICATION COORDINATION FOR MAIL PIECES

TECHNICAL FIELD

The following disclosure relates to the field of printing, and in particular, to printing mail pieces, or the digital equivalents thereof.

BACKGROUND

Entities with substantial printing demands typically use a production printer. A production printer is a high-speed printer used for volume printing, such as a continuous-forms printer that prints on a web of print media stored on a large roll, or a high-speed cut-sheet printer. A production printer typically includes a localized print controller that manages the overall operation of the printer, and a marking engine (sometimes referred to as an "imaging engine" or a "print engine"). The marking engine includes one or more arrays of printheads.

Upon receiving a print job, the print controller rasterizes logical pages of the job (e.g., to create bitmaps representing each page of the job), and the marking engine operates individual printheads to mark the web based on the rasterized logical pages. Thus, the printer marks physical pages based on the digital information of the print job.

When printing mail pieces (such as letters) for delivery, it is possible that addresses printed onto one or more mail pieces may not be compatible with an address verification system used by a delivery entity (e.g., the United States Postal Service (USPS)). In such instances, those mail pieces may fail to qualify for a discounted delivery rate, or may fail to be delivered entirely. Even in instances where the mail pieces are delivered via electronic means (e.g., as digital documents), failure to include a proper address may result in statutory compliance issues or other problems. Thus, even though a customer has opted out of physical paper delivery, it can remain important to be aware of address problems or changes that may arise. Furthermore, it is not uncommon for such address anomalies to be consistently repeated across numerous print jobs, as the operators at the print shop are generally not the authors of the print jobs being printed, and do not have the capability to correct such errors in print data.

Thus, print shop operators continue to seek out ways to identify and resolve persistent errors related to address verification for all printed letters, and also all other forms of multi-channel delivery per customer preferences

SUMMARY

Embodiments described herein dynamically detect address anomalies prior to printing, and generate workflows for correcting each address anomaly. The workflows are assigned to customers that generated the print jobs. In this manner, the customers that sourced the print jobs are capable of identifying and resolving address errors for future print jobs, and the print shop operators receive confirmation that address anomalies have been addressed and hence will not be repeated for future print jobs.

One embodiment is a system that includes a print server. The print server includes an interface that receives a print job comprising multiple mail pieces which each include an address of record from a client, and a controller that processes the print job according to a first workflow of the print server accessible by a first set of operators, detects address anomalies within the mail pieces by accessing an address verification system of a delivery entity, generates a second workflow that is for handling a mail piece having an address anomaly and is accessible only by a second set of operators distinct from the first set of operators, and confirms that the address of record for the mail piece in the second workflow has been updated based on input from the second set of operators. The first workflow and the second workflow each comprise a series of tasks performed via the print server.

A further embodiment is a method that includes receiving, at a print server, a print job comprising multiple mail pieces which each include an address of record from a client, processing the print job according to a first workflow of the print server accessible by a first set of operators, detecting address anomalies within the mail pieces by accessing an address verification system of a delivery entity, generating a second workflow that is for handling a mail piece having an address anomaly and is accessible only by a second set of operators distinct from the first set of operators, and confirming that the address of record for the mail piece in the second workflow has been updated based on input from the second set of operators. The first workflow and the second workflow each comprise a series of tasks performed via the print server for at least one of printed output or an electronic equivalent to printed mail.

A further embodiment is a non-transitory computer readable medium embodying programmed instructions which, when executed by a processor, are operable for performing a method. The method includes receiving, at a print server, a print job comprising multiple mail pieces which each include an address of record from a client, processing the print job according to a first workflow of the print server accessible by a first set of operators, detecting address anomalies within the mail pieces by accessing an address verification system of a delivery entity, generating a second workflow that is for handling a mail piece having an address anomaly and is accessible only by a second set of operators distinct from the first set of operators, and confirming that the address of record for the mail piece in the second workflow has been updated based on input from the second set of operators. The first workflow and the second workflow each comprise a series of tasks performed via the print server for at least one of printed output or an electronic equivalent to printed mail.

Other illustrative embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific illustrative embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
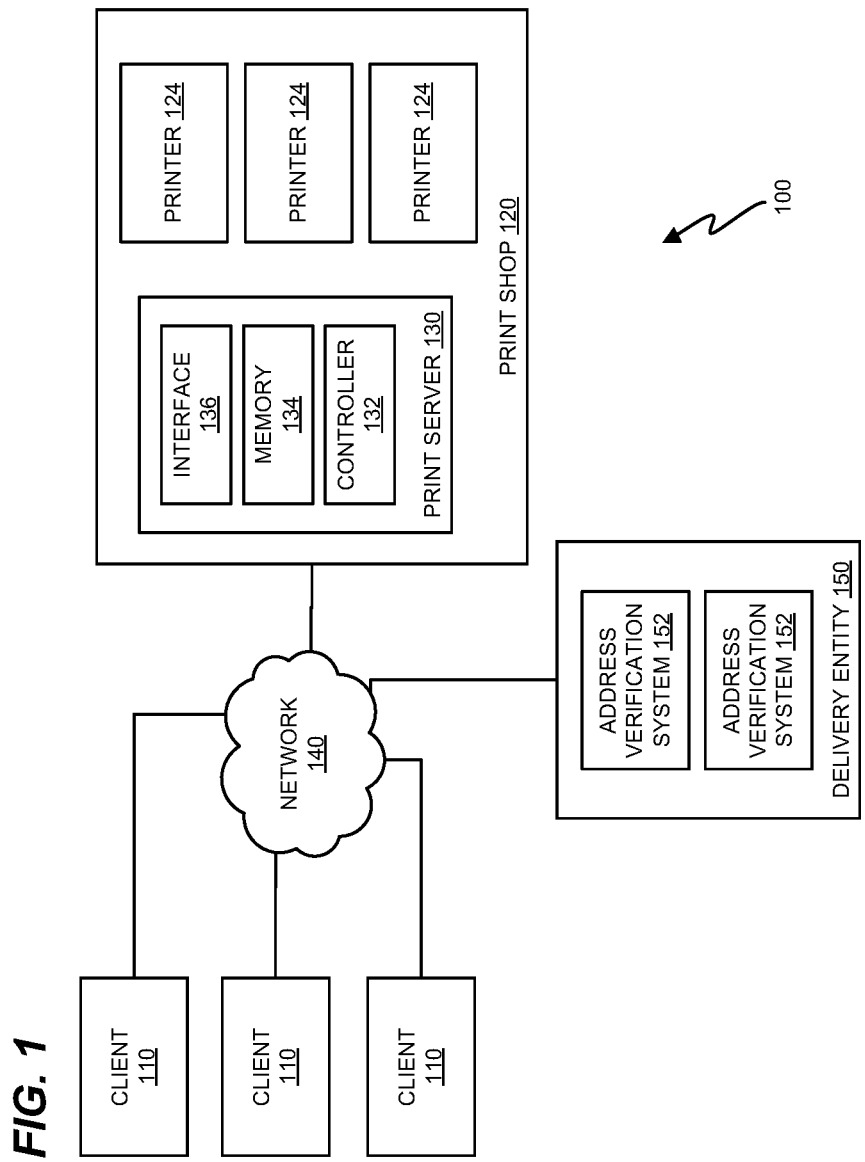
FIG. 1 is a block diagram of a printing environment that performs address verification in an illustrative embodiment.

FIG. 1 is a block diagram of a printing environment 100 that performs address verification in an illustrative embodiment. Printing environment 100 comprises any combination of systems, components, or devices that handles incoming print jobs comprising print data for a plurality of mail pieces (e.g., hundreds of thousands of mail pieces), identifies the mail pieces within the print jobs, and verifies addresses of record for the mail pieces. As used herein, a mail piece comprises a physically printed item (a "physical mail piece"), or a digital equivalent thereof (a "digital mail piece"), for delivery to a recipient. Printing environment 100 has been enhanced to generate special workflows for handling address anomalies detected during address verification for a print job. For example, the printing environment 100 may generate workflows for handling by clients 110 that have access to source data used to generate the print jobs. Generating workflows for handling by those outside of the print shop 120 provides a technical benefit because it makes the customers that generate and submit the print jobs aware of address anomalies in their print jobs that may not otherwise be known.

In this embodiment, the printing environment 100 includes clients 110, which comprise servers or other computing devices operated by customers of a print shop 120. The clients 110 transmit print jobs, in the form of print data and/or accompanying job tickets, to print server 130 of the print shop 120. The print jobs are transmitted via a network 140, such as the Internet. The print jobs are received at interface 136 of the print server 130, and are stored in memory 134 for later printing. A controller 132 of the print server 130 generates workflows for handling each of the print jobs. In this embodiment, each workflow schedules a print job for mail piece identification, address extraction, address verification, printing, and/or other operations. Controller 132 may be implemented as custom circuitry, as a hardware processor executing programmed instructions, etc. Print server 130 itself may be implemented as a physical server, a virtual server, or a cloud computing equivalent thereto.

Addresses extracted by controller 132 from the print job are known as Addresses of Record (AORs). AORs are owned/controlled by a Line of Business (i.e., a portion of a legal entity) having authority to change the AOR, and this authority does not extend to a print shop 120. The AORs are sent to one or more address verification systems 152 of delivery entity 150 for address verification. Address verification systems 152 may comprise servers, Application Programming Interfaces (APIs), virtual servers, cloud computing services, etc. for identifying address anomalies that would complicate, delay, increase the cost of, or prevent delivery of mail pieces. Examples of address verification systems 152 include a Coding Accuracy Support System (CASS™) compliant system, a National Change of Address Link (NCOALINK™) compliant database, an Address Not Known Link (ANKLINK™) compliant database, a Deceased (DEC) database, etc. As used herein, a "compliant" system or database is one which complies with the rules recorded for corresponding standards (e.g., as issued by the USPS).

CASS™ compliant systems are also known as "address hygiene" systems. For example, a CASS™ certified program may spot structural address problems that result in a mail piece being deliverable. Full-rate first class stamps will ensure that delivery is attempted for a physical mail piece despite a structural address problem. However, this can still lead to the need for a mail piece to be returned. Also, even if the mail piece is delivered (e.g., by the USPS), an address anomaly reported by a CASS™ certified program still means that a corresponding mail piece is precluded from postage discounts, which increases expense. Address anomalies reported from CASS™ certified programs may include an address which is not found, or a structural deficiency in an address (e.g., a zip code that does not align to the indicated state, such as "NY, N.Y. 80503"). Address anomalies may be reported with ranges of severity, from extra postage payment being required, to the mail pieces being returned.

NCOALINK™ compliant databases/systems use USPS technology to identify individuals, families and businesses who have filed permanent change-of-address forms in the past eighteen or forty-eight months, depending on the service provider license acquired. ANKLINK™ compliant systems enable mailers to make informed choices regarding a specific AOR. If the data in an ANKLINK™ compliant system indicates a move, the mailer (e.g., the Line of Business having control over AORs) may choose to suppress the record from their list or attempt to determine the actual new address by engaging the services of an NCOALINK™ Full Service Provider (FSP) licensee.

In one embodiment, after a legitimate NCOA™ address change "ages out" of an NCOA™ compliant database, a pared-down version of the name and address are placed into an ANKLINK™ compliant database for another forty-eight months. While an address resides in the NCOA™ compliant database, the USPS can forward the mail to a listed new address, as well as communicate that information to mailers. By contrast, an address has been placed into an ANKLINK™ compliant database, circumstances have changed. An address reported in such a database is so old that no new addresses of the recipient are being tracked. Mail pieces directed to hits in such a database therefore will become returned mail. Any "hits" on an ANKLINK™ database therefore mean that opportunities have been missed to updated the address months or years ago, when it was in an NCOA™ compliant database. In short, hits on an ANKLINK™ compliant database are assured to generate returned mail and waste postage, if sent.

After address verification has been completed, print server 130 proceeds to instruct one or more printers 124 to print the print job (or portions thereof).

The particular arrangement, number, and configuration of components described herein is illustrative and non-limiting. Illustrative details of the operation of printing environment 100 will be discussed with regard to FIG. 2. Assume, for this embodiment, that clients 110 have been operated by customers of print shop 120 to asynchronously transmit numerous print jobs on an ongoing basis for printing. Method 200 may be performed asynchronously and/or concurrently for each of multiple print jobs during operation of the print server 130. In many instances, a print job may comprise thousands, tens of thousands, or hundreds of thousands of mail pieces.

Figure 2:
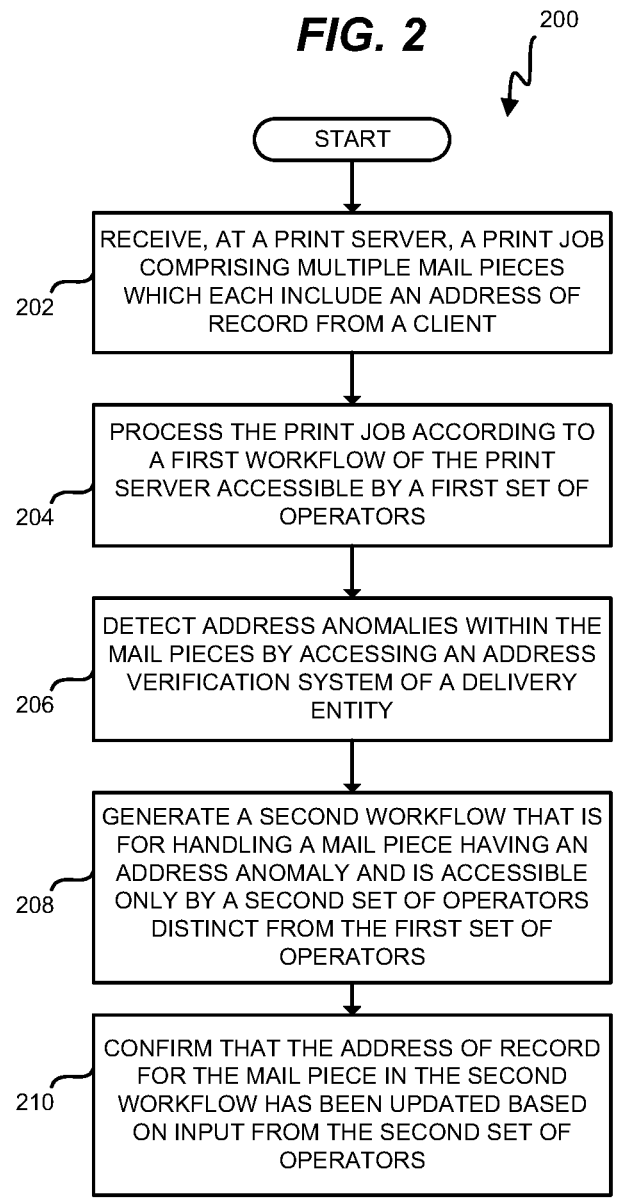
FIG. 2 is a flowchart illustrating a method for operating a printing environment that performs address verification in an illustrative embodiment.

FIG. 2 is a flowchart illustrating a method 200 for operating a printing environment that performs address verification in an illustrative embodiment. The steps of method 200 are described with reference to print shop 120 of FIG. 1, but those skilled in the art will appreciate that method 200 may be performed in other systems. The steps of the flowcharts described herein are not all inclusive and may include other steps not shown. The steps described herein may also be performed in an alternative order.

In step 202, interface 136 of print server 130 receives a print job comprising multiple mail pieces which each include an AOR/delivery address from a client. The print job may be received via Transmission Control Protocol/Internet Protocol (TCP/IP), or any suitable transmission format from client 110 to print server 130 across network 140. In one embodiment, the print job comprises Page Description Language (PDL) print data (e.g., Portable Document Format (PDF) data), and is accompanied by a job ticket, such as a Job Description Format (JDF) job ticket. Controller 132 proceeds to store the print job in memory 134 and generate a first workflow that comprises a series of tasks to perform related to the print job and is accessible by a first set of operators. The first set of operators may comprise employees, technicians, or other persons at the print shop 120 whose tasks are dedicated to facilitating the printing of print jobs on behalf of customers. For example, the first set of operators may comprise print shop operators. In many circumstances, the first set of operators are specifically precluded from altering AORs for the mail pieces. This may be the case, for example, because the print data for each print job is based on the address information in the AOR, and only the owning Line-of-Business is allowed to change AOR. Thus, in many embodiments, AORs for the print job therefore cannot be altered by those at the print shop 120.

In step 204, controller 132 processes the print job according to the first workflow of the print server 130. The first workflow comprises a series of tasks performed via the print server 130. The workflow operations for the print job may include controller 132 analyzing the print job for boundaries between mail pieces of the print job, for example based on the presence of page breaks, mail piece headers or footers (e.g. indicating page number within a mail piece), metadata indicating breaks between mail pieces, etc. Mail pieces may then be associated with unique identifiers, ranges of pages, addressees, etc.

The workflow operations may further include controller 132 actively extracting an AOR from each of the mail pieces and associating each address of record with an identifier for a corresponding mail piece. Extracting an AOR from a mail piece may include identifying an address block within the mail piece, for example based on location and page number within the mail piece. The process may further include identifying an address within the address block, for example by reading PDL print data within the address block or performing Optical Character Recognition (OCR) upon print data within the address block.

In one embodiment, controller 132 further identifies mail pieces which are assigned to addressees who have opted for digital document delivery (e.g., via email or text). This information may be provided by client 110 to controller 132, may be indicated in metadata within the print job, etc. The controller 132 may then proceed to forego address verification for such mail pieces, as the AOR may be moot for such mail pieces. However, for many Lines of Business for a customer, the AOR may still be important with respect the legal or procedural requirements, even when a mail piece is provided as a digital mail piece for e-delivery.

In step 206, controller 132 detects address anomalies within the mail pieces by accessing an address verification system 152 of a delivery entity 150. This may comprise, for example, submitting extracted addresses of record to CASS™ compliant system, an NCOALINK™ compliant system, an ANKLINK™ compliant system, a DEC database, etc. CASS™ compliant systems may provide codes indicating the presence or absence of an address anomaly for each address of record, while controller 132 may compare addresses of record to the various databases discussed above in order to detect further address anomalies. While many mail pieces within the print job may have no address anomalies, it is likely that one or more mail pieces within the print job will have associated address anomalies that complicate, delay, increase delivery expense, or prevent delivery entirely.

In one embodiment, controller 132 excises the mail pieces having address anomalies from the print job. This enables the mail pieces having address anomalies to be printed at a later date with correct address information. In a further embodiment, the mail pieces having address anomalies are kept in the print job for delivery despite having potential delivery issues. Delivery may be accomplished by a variety of means. For example, in one embodiment, at least one of the mail pieces is delivered to clients via alternative means, or in alternative channels, selected from the group consisting of: Americans with Disability Act (ADA)-compliant electronic means, Braille, large-type, or a screen reader format.

In step 208, controller 132 generates a second workflow that is for handling a mail piece having an address anomaly. The second workflow comprises a series of tasks performed via the print server 130. The tasks of the second workflow are distinct from the tasks of the first workflow.

The second workflow is accessible only by a second set of operators distinct from the first set of operators. In one embodiment, the second set of operators comprise users of the client 110, such as agents or employees of a customer that operates the client 110. That is, the second set of operators may comprise employees of the customer that submitted the print job that have write access to source databases that were used to determine addresses of record for the mail pieces of the print job. In further embodiments, the second set of operators comprise employees of a contractor that provides the print job on behalf of a third party.

The second workflow includes a task for updating AOR (e.g., the delivery address) to be performed by at least one of the second set of operators. In one embodiment, controller 132 generates a new print job for each mail piece having an address anomaly, and assigns each new print job to the second workflow. That is, each new print job is assigned for independent completion of the tasks of the second workflow. In one embodiment, a suggestion is automatically provided by controller 132 to update the address to a new/moved address indicated in an NCOA database.

In one embodiment, updating the AOR is performed by a user of client 110 altering an address storage (e.g., a database) of the client 110 that was used to provide address information for the print job. For example, one of the second set of operators may attempt to contact the addressee via an alternate channel of communication (e.g., phone, email, etc.) to determine a new address of record, and then update the address storage of the client 110 based on this input.

In step 210, controller 132 confirms that the AOR for the mail piece in the second workflow has been updated, based on input from the second set of operators. This may be determined, for example, based on input from client 110 confirming that the AOR has been updated in a database of the client 110.

Method 200 provides a technical benefit by communicating address anomalies to the entities that source print jobs to a print shop. This enables address anomalies to be corrected "at the source" instead of being encountered again and again at a print shop where the print data can no longer be corrected.

In a further embodiment, controller 132 identifies mail pieces that have repeatedly had an address anomaly across multiple print jobs, and reports to the client 110 a number of times that each mail piece that was identified has had an address anomaly, or an amount of time that the address anomaly has remained uncorrected. This enables a user of the client 110 to rapidly identify addresses that have been improperly revised or that are in need of immediate revision.

In a still further embodiment, having received confirmation that the AOR has been updated, controller 132 prints an updated print job for the mail piece having the updated AOR. In such an embodiment, client 110 provides the updated address, and/or an updated print job for the mail piece, in addition to providing a confirmation that the AOR has been updated.

Figure 3:
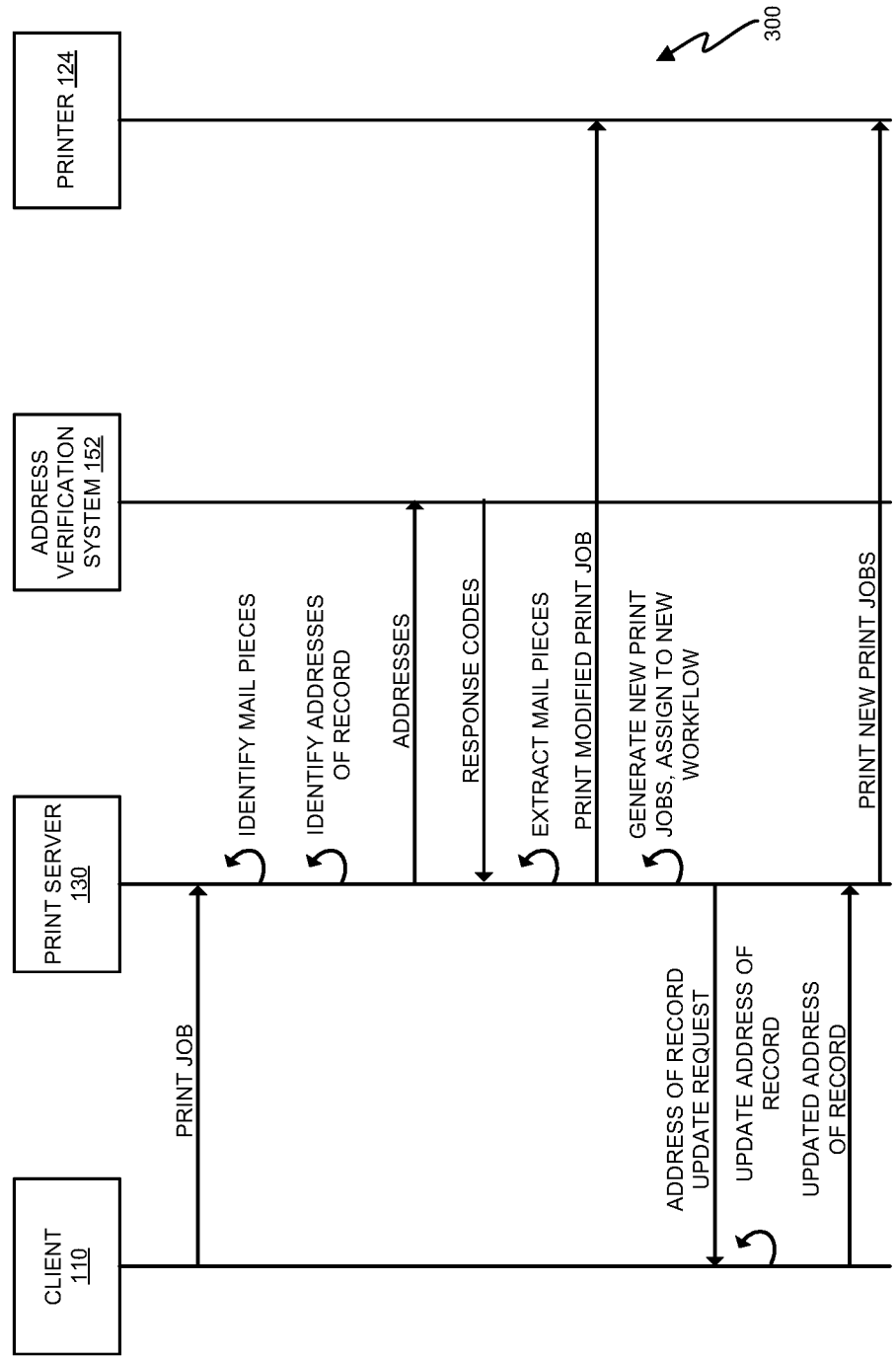
FIG. 3 is message diagram depicting communications between components of a printing environment that performs address verification in an illustrative embodiment.

FIG. 3 is message diagram 300 depicting communications between components of a printing environment that performs address verification in an illustrative embodiment. As shown in message diagram 300, a client 110 transmits a print job to a print server 130. The print server 130 processes the print job to identify mail pieces and corresponding AORs. The print server 130 then transmits the addresses to an address verification system 152, which provides response codes to the print server 130. The print server 130 excises mail pieces having response codes that indicate the presence of an address anomaly from the print job. The print server 130 then prints the modified print job via a printer 124.

The print server additionally generates new print jobs for the excised mail pieces, and assigns the new print jobs to a new workflow. For each print job, the new workflow includes a task for updating AOR. To this end, print server 130 transmits an AOR update request to the client 110, and an operator at the client 110 updates the AOR. In response to the AOR being updated, the client 110 updates the address and transmits a confirmation to the print server 130. In one embodiment the client 110 also transmits print data for the new print job that includes an updated AOR. Print server 130 may then direct the printer 124 to print the corresponding new print job, until all mail pieces having address anomalies have been updated and printed for delivery.

Figure 4:
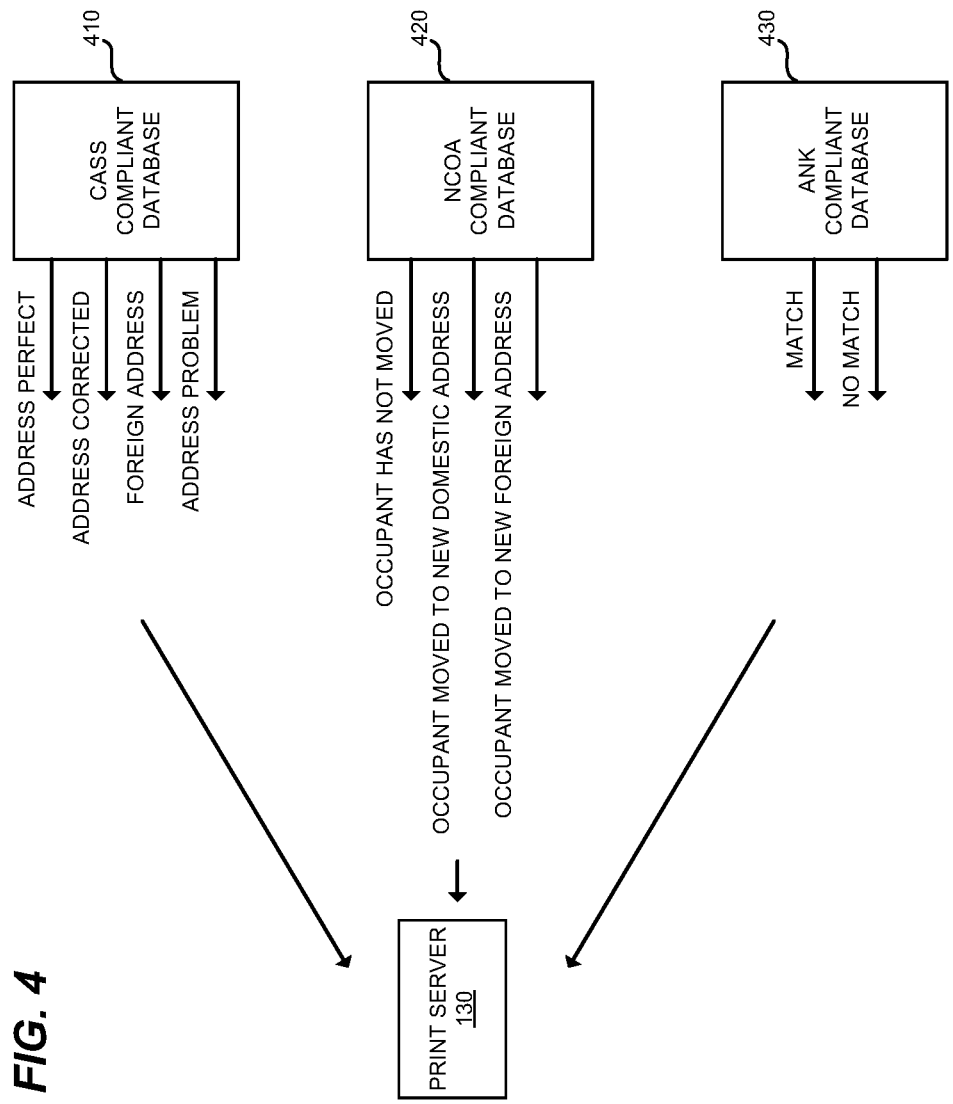
FIG. 4 is a diagram that depicts responses from address verification systems to a print server in an illustrative embodiment.

FIG. 4 is a diagram that depicts responses from address verification systems to a print server in an illustrative embodiment. In this embodiment, the address verification systems include CASS™ compliant entity 410 ("CASS™ 410"), the NCOA™ compliant database 420 ("NCOA™ 420"), and the ANK™ compliant database 430 ("ANK™ 430") hosted by a delivery entity 150 such as the USPS. In this embodiment, CASS™ compliant entity 410 is capable of returning codes indicating a perfect address, an address that needs to be corrected in order to qualify for a discounted mail rate, a foreign address, or an address problem (e.g., address not found). NCOA™ compliant database 420 is capable of returning codes indicating whether the occupant has not moved, has moved to a new domestic address, or has moved to a new foreign address.

As discussed above, when a legitimate NCOA™ address change "ages out" of an NCOA™ compliant database, a pared-down version of the name and address are placed into an ANK™ compliant database for another forty-eight months. The ANK™ compliant database 430 therefore stores records listing addresses (and corresponding recipients) for which mail will not be delivered or forwarded. These are addresses which are so out-of-date that the USPS can no longer report a new address for the individual, as is done with NCOA™. Thus, when an AOR matches an entry in an ANK™ compliant database 430, the address of the record is not known. The recipient has moved, but the move took place so long ago that mail forwarding will no longer take place. Even when an AOR does not match any entry in an ANK™ compliant database 430, there is no confirmation that the occupant has not moved, or that mail will be forwarded. Rather, there is simply no confirmation that the AOR is out of date. ANK™ compliant database 430 can also provide an effective date of the move for review by the system, as desired.

Print server 130, upon determining these codes, may include directions specific to each code within any second workflows that it generates. For example, a code from NCOA™ compliant database 420 indicating that an occupant has moved to a new address may result in print server 130 providing a notification to a client 110 requesting an updated, post-move address, while a code from CASS™ compliant entity 410 indicating that an address has been corrected may include a request for a more detailed postal code or a changed abbreviation.

Figure 5:
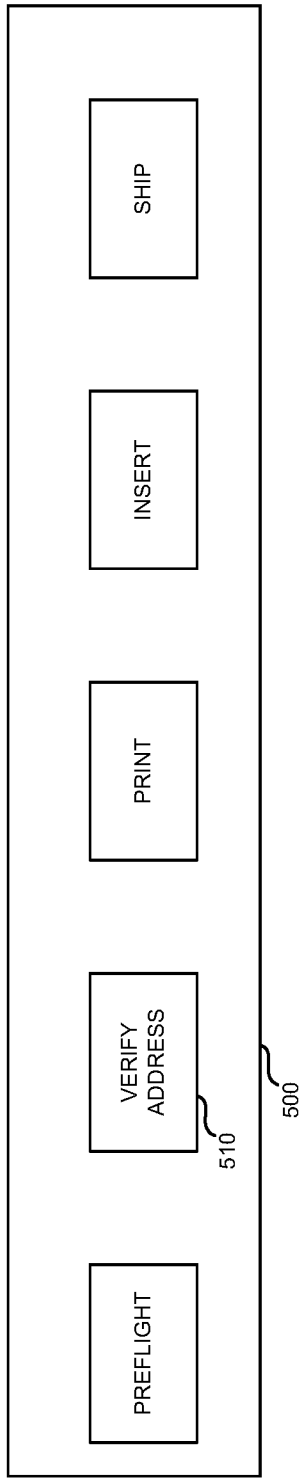
FIGS. 5-6 depict workflows for handling initial print jobs and individual mail pieces having address anomalies in an illustrative embodiment.
Figure 6:
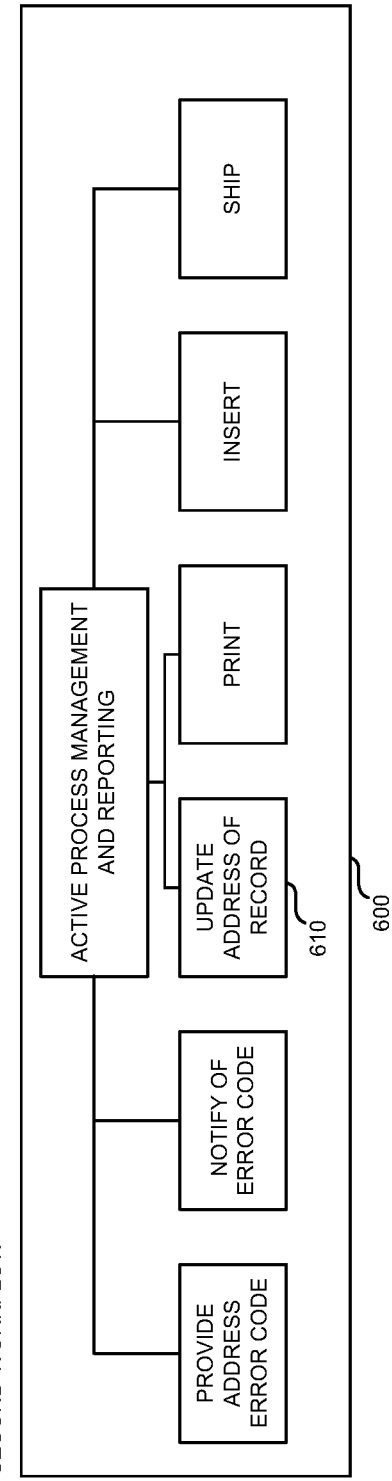

FIGS. 5-6 depict workflows for handling initial print jobs and individual mail pieces having address anomalies in an illustrative embodiment. Workflow 500 of FIG. 5 may be utilized by print server 130, for example, to process an incoming print job comprising numerous mail pieces. In FIG. 5, workflow 500 includes multiple tasks 510 for printing a print job comprising multiple mail pieces. Specifically, the tasks include preflight review and proofing of the print job for spelling and grammar errors, address verification, printing, inserting printed mail pieces into envelopes, and shipping the mail pieces to a delivery entity 150 for delivery.

FIG. 6 depicts a workflow that may be generated for a mail piece having an address of record with an address anomaly. Workflow 600 of FIG. 6 may be utilized by print server 130, for example, to process a specific mail piece having an address anomaly. In FIG. 6, workflow 600 includes tasks 610 such as print server 130 providing an address error code to client 110, an operator at client 110 updating the address of record and/or providing an updated print job having the updated address of record, printing the mail piece, inserting the mail piece into an envelope, and shipping the mail piece. In further embodiments, the print server 130 repeats address verification for the updated address of record, and requests another update to the address of record if another address anomaly is detected.

For each second workflow, controller 132 may engage in active process management and reporting as shown in FIG. 6. Such activities may include: determining the age of a job for changing/updating AOR; determining a person or Line of Business that the job has been assigned to (e.g., currently and/or previously); reporting a total number of mail pieces, categorized by return code and/or importance, as well as numbers of reoccurrences of such; performing long term tracking to determine whether an address anomaly been reported previously; reporting a number of address anomalies for a prior month or other time period in total; determining a number of address anomalies that were successfully resolved (e.g., instead of remaining unaddressed); determining a total cost to the Line of Business (or incremental savings available to the Line of Business for fixing all address anomalies. All of these tracking processes may provide substantial value to Lines of Business within an organization, having the authority to update Addresses of Record. These activities may be performed for individual second workflows, and/or aggregated for all second workflows relating to a specific print job and/or customer.

With a discussion provided above for how print jobs are handled and addresses are verified, further discussion is provided to describe user interfaces for updating addresses of record and tracking the progress of print jobs within workflows.

Figure 7:
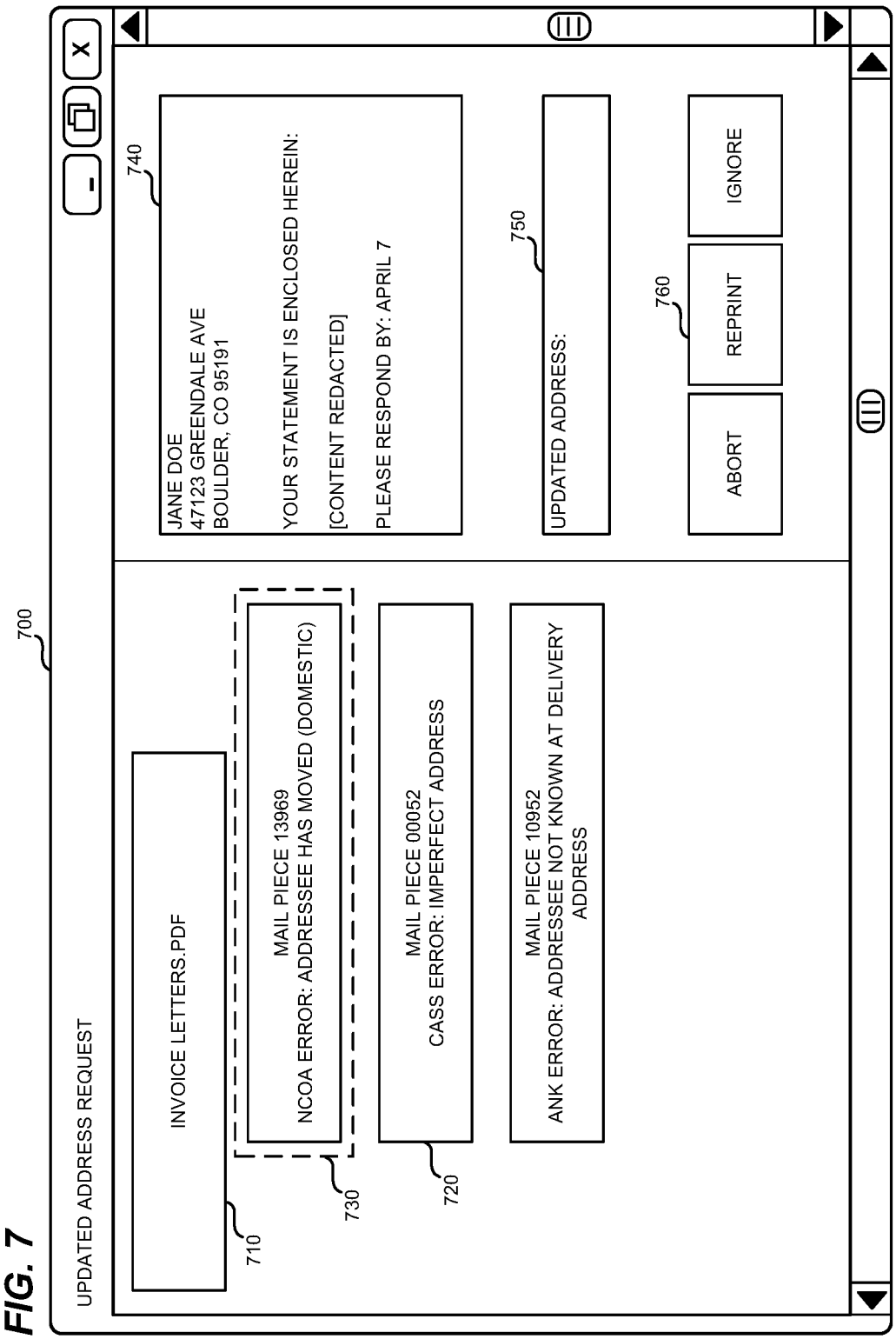
FIG. 7 depicts a Graphical User Interface (GUI) for reviewing and correcting address anomalies in an illustrative embodiment.

FIG. 7 depicts a Graphical User Interface (GUI) 700 for reviewing and correcting address anomalies in an illustrative embodiment. Thus, GUI 700 may be presented to a user of client 110 in order to update an address of record. In this embodiment, GUI 700 includes a list of mail pieces 720 having address anomalies within a print job 710. The user has made a selection 730 of a specific mail piece 720, and has been provided with details 740 for that mail piece 720. The GUI 700 also includes a field 750 for receiving an updated address, as well as buttons 760 for aborting printing of the mail piece (i.e., canceling the print job for the mail piece), reprinting the mail piece 720 with the updated address provided in field 750, or ignoring the address anomaly, printing the mail piece as-is, and marking the issue as resolved. Aborting may be beneficial in circumstances when, for example, the information in the mail piece has been communicated via another channel (e.g., email or phone), the addressee is no longer in need of the mail piece, etc. Ignoring may be beneficial in circumstances wherein the mail piece will still be delivered, but at an undiscounted rate.

Figure 8:
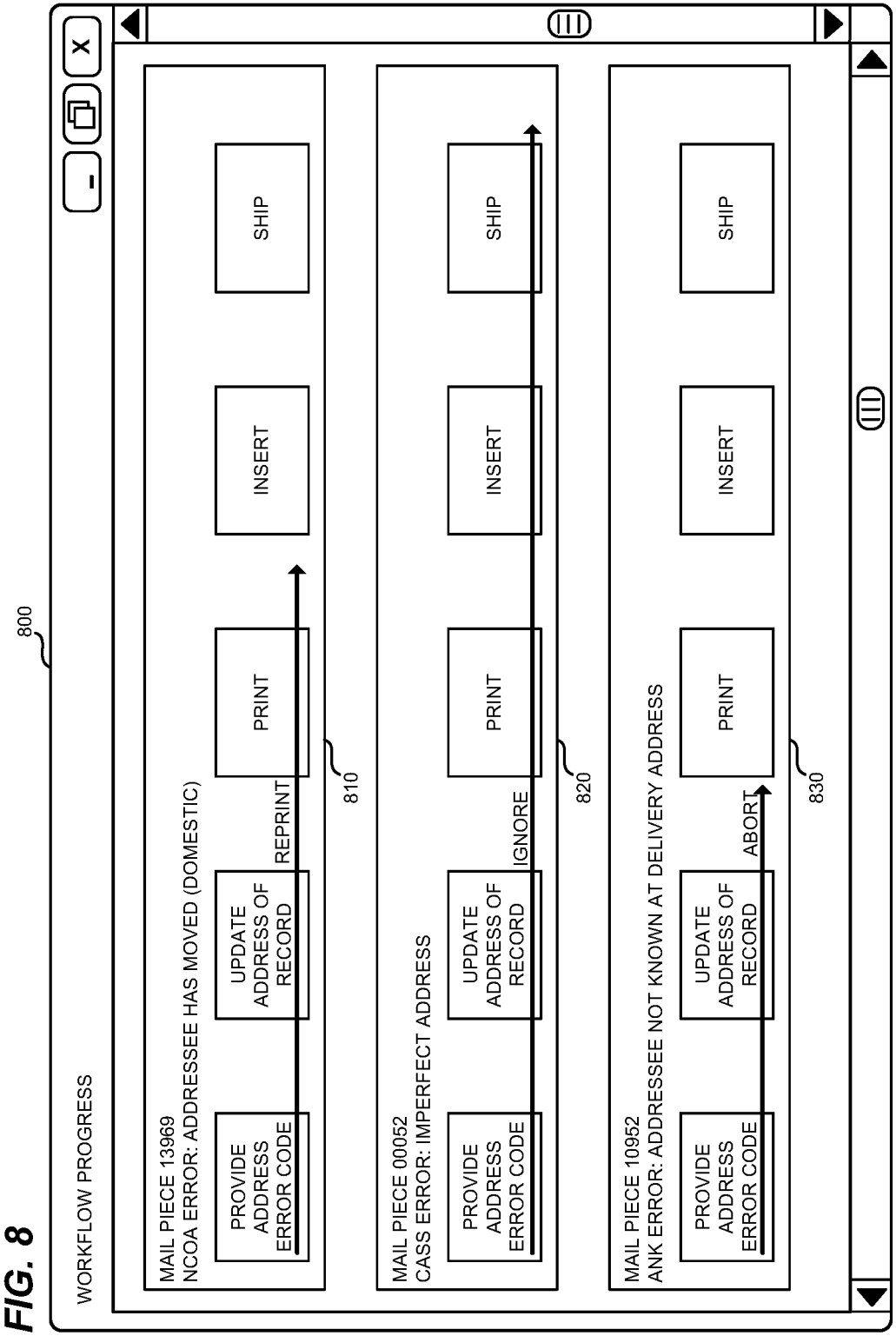
FIG. 8 depicts a GUI for tracking workflow progress in an illustrative embodiment.

FIG. 8 depicts a GUI 800 for tracking workflow progress in an illustrative embodiment. GUI 800 may be presented, for example, at a display for print server 130 or other computing device logged into print server 130. In this embodiment, GUI 800 depicts progress through a workflow 810 for a first mail piece having a delivery anomaly, progress through a workflow 820 for a second mail piece having a delivery anomaly, and progress through a workflow 830 for a third mail piece having a delivery anomaly. Progress through each workflow is indicated via an arrow, which is halted at the last task that was completed in the workflow. Each workflow also includes instructions regarding whether to reprint, ignore, or abort. In this manner, GUI 800 provides a benefit by enabling tracking of a large number of second workflows via a single window.

It is of particular note that the steps of each workflow in FIG. 8 need not be linear. Many workflow events may be tied to monthly mail cycles (e.g., bank statements). Thus, a particular client may simply update the Address of Record during the month, opting to send the mail piece "as is" for the current month, while also working on the address issue "offline," so that address anomalies have been corrected for next month's billing. Thus, the steps of the workflows depicted herein may not be linear, or exclusive, to the respective tracks.

EXAMPLES

In the following examples, additional processes, systems, and methods are described. The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. For example, such embodiments may implement a print server 130 as a virtualized server or cloud computing system as desired.

Figure 9:
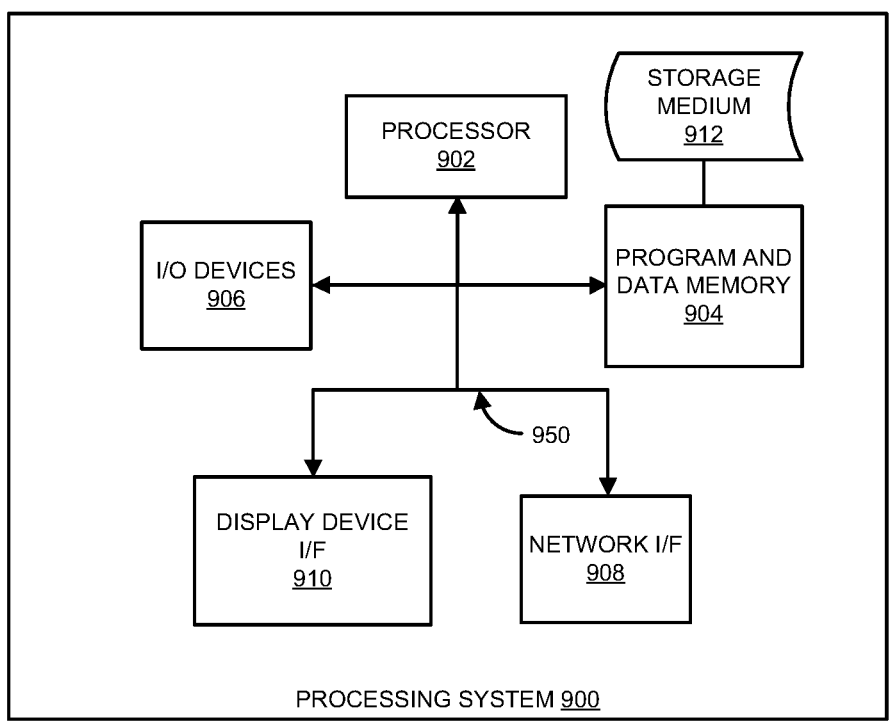
FIG. 9 illustrates a processing system operable to execute a computer readable medium embodying programmed instructions to perform desired functions in an illustrative embodiment.

Embodiments disclosed herein can take the form of software, hardware, firmware, or various combinations thereof. In one particular embodiment, software is used to direct a processing system of printing environment 100 to perform the various operations disclosed herein. FIG. 9 illustrates a processing system 900 operable to execute a computer readable medium embodying programmed instructions to perform desired functions in an illustrative embodiment. Processing system 900 is operable to perform the above operations by executing programmed instructions tangibly embodied on computer readable storage medium 912. In this regard, embodiments of the invention can take the form of a computer program accessible via computer-readable medium 912 providing program code for use by a computer or any other instruction execution system. For the purposes of this description, computer readable storage medium 912 can be anything that can contain or store the program for use by the computer.

Computer readable storage medium 912 can be an electronic, magnetic, optical, electromagnetic, infrared, or semiconductor device. Examples of computer readable storage medium 912 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 900, being suitable for storing and/or executing the program code, includes at least one processor 902 coupled to program and data memory 904 through a system bus 950. Program and data memory 904 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 906 (including but not limited to keyboards, displays, pointing devices, etc.) can be coupled either directly or through intervening I/O controllers. Network adapter interfaces 908 may also be integrated with the system to enable processing system 900 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 910 may be integrated with the system to interface to one or more display devices, such as printing systems and screens for presentation of data generated by processor 902.

Although specific embodiments were described herein, the scope of the invention is not limited to those specific embodiments. The scope of the invention is defined by the following claims and any equivalents thereof.

What is claimed is:

1. A system comprising:
    a print server comprising:
        an interface configured to receive from a client a first print job comprising multiple mail pieces, wherein each mail piece includes an address of record; and
        a controller configured:
            to detect one or more of the mail pieces having address anomalies by accessing an address verification system of a delivery entity,
            to remove the one or more mail pieces having address anomalies from the first print job to generate a modified print job without the one or more mail pieces having address anomalies,
            to generate one or more second print jobs comprising the one or more mail pieces having anomalies removed from the first print job,
            to process to completion the modified print job according to a first workflow of the print server accessible by a first set of operators,
            to generate a second workflow for processing the one or more second print jobs, wherein the second workflow is accessible by a second set of operators, distinct from the first set of operators, to correct anomalies in the one or more mail pieces having address anomalies,
            to confirm that the address of record for the one or more mail pieces having address anomalies in the second workflow has been updated based on input from the second set of operators, and
            responsive to confirmation that the address of record for the one or more mail piece having address anomalies has been updated, to process to completion the one or more second print jobs according to the second workflow,
            wherein the first workflow and the second workflow each comprise a series of tasks performed via the print server.

2. The system of claim 1 wherein:
    the controller is further configured to preclude the first set of operators from altering addresses of record for the one or more mail pieces having address anomalies.

3. The system of claim 1 wherein:
    the first set of operators comprise print shop operators, and the second set of operators comprise users of the client.

4. The system of claim 1 wherein:
    the second workflow includes a task for updating address of record to be performed by at least one of the second set of operators.

5. The system of claim 4 wherein:
    updating the address of record is performed by altering an address storage of the client that was used to generate the print job.

6. The system of claim 4 wherein performing the task of updating comprises at least one of:
    correcting the address of record for a mail piece of the one or more mail pieces having address anomalies,
    aborting the printing of the mail piece, and
    ignoring the anomalous address of record for the mail piece.

7. The system of claim 1 wherein:
    at least one of the mail pieces is delivered to clients via alternative means selected from the group consisting of: Americans with Disability Act (ADA) compliant electronic means, Braille, large-type, or a screen reader format.

8. The system of claim 1 wherein:
    the address verification system is selected from the group consisting of: a Coding Accuracy Support System (CASS) compliant system, a National Change of Address (NCOA) compliant database, and an Address Not Known (ANK) compliant database.

9. The system of claim 1 wherein:
    the controller is further configured to identify mail pieces that have repeatedly had an address anomaly across multiple print jobs, and to report to the client a number of times that each mail piece that was identified has had an address anomaly.

10. A method comprising:
    receiving, at a print server from a client, a first print job comprising multiple mail pieces, wherein each mail piece includes an address of record;
    detecting one or more of the mail pieces having address anomalies by accessing an address verification system of a delivery entity;
    removing the one or more mail pieces having address anomalies from the first print job to generate a modified print job without the one or more mail pieces having address anomalies;
    generating one or more second print jobs comprising the one or more mail pieces having address anomalies;
    processing, to completion, the modified print job according to a first workflow of the print server accessible by a first set of operators;
    generating a second workflow for processing the one or more second print jobs, wherein the second workflow is accessible by a second set of operators, distinct from the first set of operators, to correct address anomalies in one or more mail pieces having address anomalies;
    confirming that the address of record for the one or more mail pieces having address anomalies in the second workflow has been updated based on input from the second set of operators; and
    responsive to confirmation that the address of record for the one or more mail pieces having address anomalies has been updated, processing to completion the one or more second print jobs according to the second workflow,
    wherein the first workflow and the second workflow each comprise a series of tasks performed via the print server for at least one of printed output or an electronic equivalent to printed mail.

11. The method of claim 10 further comprising:
    precluding the first set of operators from altering addresses of record for the one or more mail pieces having address anomalies.

12. The method of claim 10 wherein:
    the first set of operators comprise print shop operators, and the second set of operators comprise users of the client.

13. The method of claim 10 wherein:
the second workflow includes a task for updating address of record to be performed by at least one of the second set of operators.

14. The method of claim 13 wherein:
updating the address of record is performed by altering an address storage of the client that was used to generate the print job.

15. The method of claim 13 wherein performing the task of updating comprises at least one of:
correcting the address of record for a mail piece of the one or more mail pieces having address anomalies,
aborting the printing of the mail piece, and
ignoring the anomalous address of record for the mail piece.

16. The method of claim 10 wherein:
at least one of the mail pieces is delivered to clients via alternative means selected from the group consisting of: Americans with Disability Act (ADA)-compliant electronic means, Braille, large-type, or a screen reader format.

17. The method of claim 10 wherein:
the address verification system is selected from the group consisting of: a Coding Accuracy Support System (CASS) compliant system, a National Change of Address (NCOA) compliant database, and an Address Not Known (ANK) compliant database.

18. A non-transitory computer readable medium embodying programmed instructions which, when executed by a processor, are operable for:
receiving, at a print server from a client, a first print job comprising multiple mail pieces, wherein each mail piece includes an address of record;
detecting one or more of the mail pieces having address anomalies by accessing an address verification system of a delivery entity;
removing the one or more mail pieces having anomalies from the first print job to generate a modified print job without the one or more mail pieces having address anomalies;
generating one or more second print jobs comprising the one or more mail pieces having anomalies removed from the first print job;
processing to completion the modified print job according to a first workflow of the print server accessible by a first set of operators;
generating a second workflow for processing the one or more second print jobs, wherein the second workflow is accessible by a second set of operators distinct from the first set of operators;
confirming that the address of record for the one or more mail pieces having address anomalies in the second workflow has been updated based on input from the second set of operators; and
responsive to confirmation that the address of record for the one or more mail pieces having address anomalies has been updated, processing, to completion, the one or more second print jobs according to the second workflow,
wherein the first workflow and the second workflow each comprise a series of tasks performed via the print server.

19. The non-transitory computer readable medium of claim 18 further comprising:
precluding the first set of operators from altering addresses of record for the one or more mail pieces having address anomalies.

20. The non-transitory computer readable medium of claim 18 wherein:
the first set of operators comprise print shop operators, and the second set of operators comprise users of the client.

* * * * *